United States Patent [19]
Warren

[11] Patent Number: 5,448,804
[45] Date of Patent: Sep. 12, 1995

[54] RETENTION CLIP

[75] Inventor: Lawrence L. Warren, Birmingham, Mich.

[73] Assignee: The Standard Products Company, Cleveland, Ohio

[21] Appl. No.: 227,065

[22] Filed: Apr. 13, 1994

[51] Int. Cl.⁶ ............................................. F16B 19/00
[52] U.S. Cl. ....................................... 24/297; 24/289; 411/553
[58] Field of Search ................. 24/295, 297, 292, 293, 24/294, 290, 289, 590, 591, 595; 411/349, 553, 552, 549; 52/208

[56] References Cited

U.S. PATENT DOCUMENTS

| 3,080,629 | 3/1963 | Meyer | 24/297 |
| 3,230,592 | 1/1966 | Hosea | 24/297 |
| 4,739,543 | 4/1988 | Harris, Jr. | 24/297 |
| 5,142,834 | 9/1992 | Laclave et al. | |

FOREIGN PATENT DOCUMENTS

| 0229840 | 11/1985 | Japan | 24/289 |
| 1011083 | 11/1965 | United Kingdom | 24/297 |

Primary Examiner—Victor N. Sakran
Attorney, Agent, or Firm—Harness, Dickey & Pierce

[57] ABSTRACT

A clip member for securement of a trim member to a slot in the sheet of a vehicle. The clip member includes a base portion which includes a dovetail for attachment of the base portion to a trim member. The clip also includes a shaft portion which has an axis and is connected to the base member. The shaft member is adapted for allowing resilient rotational deflection about the axis of the shaft. A locking protrusion extends from the shaft portion and includes a locking shelf for engaging the sheet portion of the vehicle. The locking protrusion also includes a ramp portion which is operable for deflecting in response to engaging the slot and rotating the locking protrusion about the axis of the shaft during insertion of the protrusion into the slot. The shaft is resilient such that upon full insertion of the locking protrusion into the slot, the protrusion rotates in the opposite direction when reaching the locking shelf and the locking shelves secure the protrusion by engaging the opposite side of the sheet metal.

13 Claims, 3 Drawing Sheets

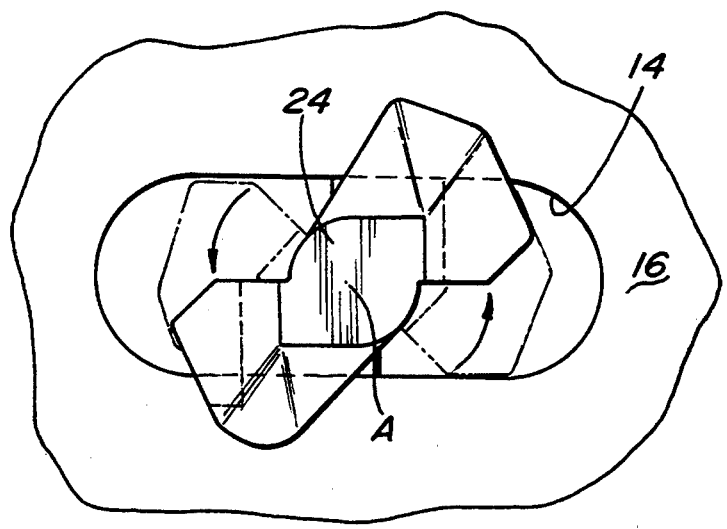
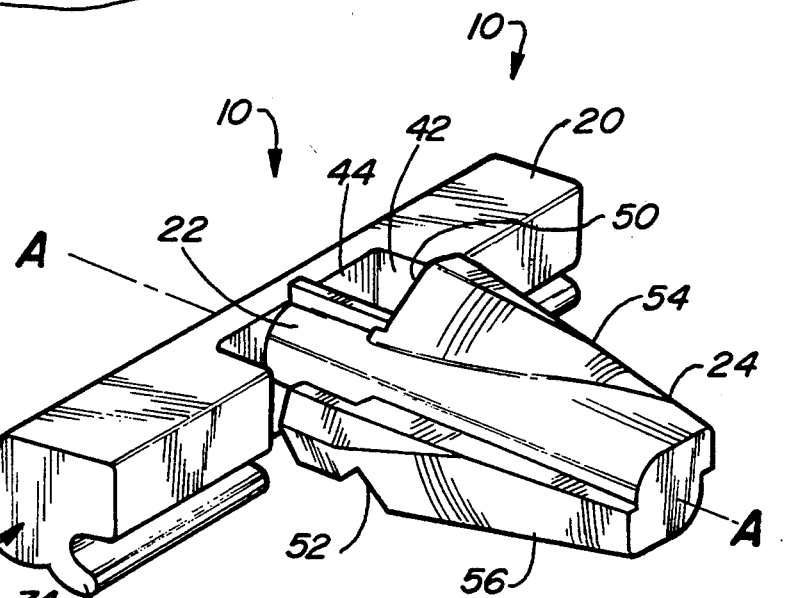
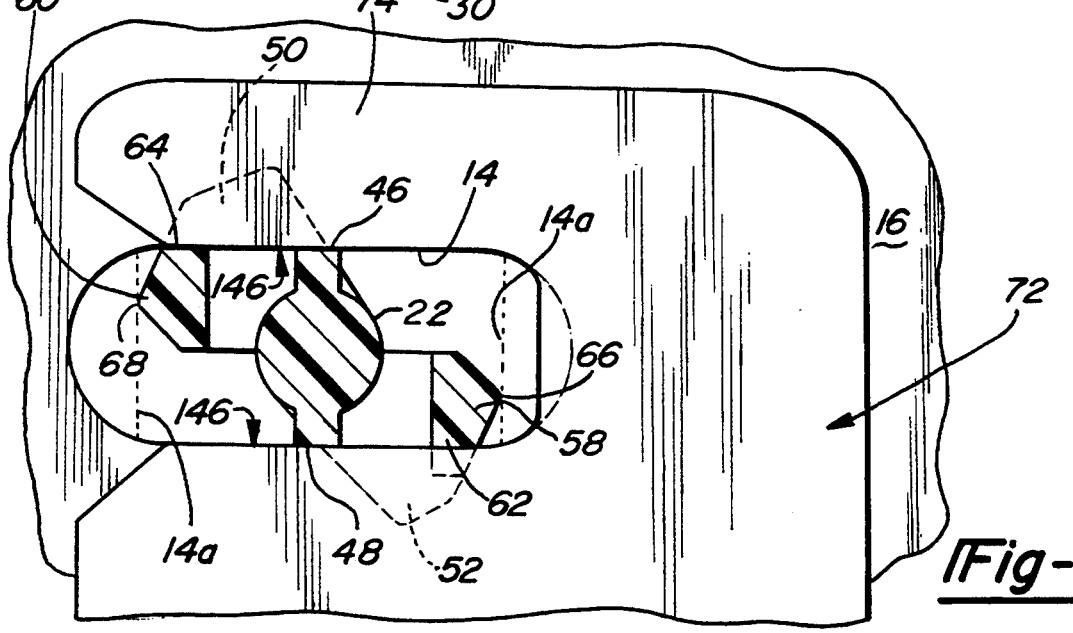

RETENTION CLIP

BACKGROUND OF THE INVENTION

The present invention relates to a retention clip member for securement of moldings, weatherstrips, facias or other members which require attachment to a vehicle, hereinafter collectively referred to as "trim members". More specifically, the present invention relates to a clip member for retention of a trim member by way of press fitting the clip member into a slot in a vehicle panel.

In the past, many types of retention devices have been used for securement of trim members onto body portions of the vehicle. In present use, some trim members must be securely attached by way of a nut-and-bolt type assembly, particularly at the end cap portion of a belt weatherstrip. One method in use today requires an intricate assembly for attaching the end cap to a trim strip. Thereafter a bolt must be retained in the end cap portion for allowing attachment to a vehicle. During assembly, the end cap portion and bolt are attached to the vehicle. A worker must be utilized to place the final nut on the retention bolt to retain the end cap to the vehicle. Thus, it would be desirable in the art to reduce the number of parts required for assembly of the end cap onto the trim strip, and thereafter, assembly of the end cap on the vehicle. Such an end cap construction would save costs in both parts and labor.

Other retention clips are utilized which allow for press fitting into an orifice of a vehicle. Many retention clips which are utilized in vehicles today are semi-permanent. By this, it is meant that once the clips and the trim member are in place, it is prohibitive to try to disengage the clip from the vehicle. This is because no provision is provided for the removal of the clip in the design of the clip. This creates a problem in that, if a trim member requires replacement during vehicle body work or the like, vehicle surfaces may be damaged during the replacement of the clip.

Thus, in a retention clip configuration, it is desirable to have a ready means for nondestructive removal of the clip should the same be necessary. It would also be desirable if such clip could provide easy attachment of trim members to a vehicle.

SUMMARY OF THE INVENTION

In accordance with the above goals and objectives, there is provided in the present invention a clip member for securement of a trim member to a slot in a sheet portion of a vehicle. The clip member includes a base portion which includes a means for attachment of the base portion to a trim member. The clip also includes a shaft portion which has a central axis and is connected to the base member. The shaft member is adapted for allowing at least partial resilient rotational deflection about the axis of the shaft. A locking protrusion extends from the shaft portion and includes a locking shelf for engaging the sheet portion of the vehicle. The locking protrusion also includes a ramp portion which is operable for deflecting in response to engaging the slot and rotating the locking protrusion about the axis of the shaft during insertion of the protrusion into the slot. The shaft is resilient such that upon full insertion of the locking protrusion into the slot, the protrusion rotates in the opposite direction when reaching the locking shelf. This allows the locking shelf to secure the protrusion in the slot by engaging the opposite side of the sheet metal. The clip of the present invention may be molded integrally with trim members or may be otherwise attached to a trim member for insertion into the slot and provides secure attachment of the trim member to the vehicle by way of a push type connector. Thus, the trim member of the present invention allows less steps in attachment of an end cap, for instance, to a vehicle, thereby resulting in both cost and time savings.

Further objects, advantages and features of the present invention will become apparent from the following description and appended claims, taken in conjunction with the accompanying drawings.

BRIEF DESCRIPTION OF THE DRAWINGS

FIG. 3 is a rear plan view taken in the direction 3—3 showing the locking protrusion of the present invention in its operating environment;

FIG. 4 is a detailed perspective view showing an embodiment of a retention clip member made in accordance with the teachings of the present invention;

FIG. 5 is a section of the retention clip member showing a tool for removal of a clip member from the slot.

DETAILED DESCRIPTION OF THE PREFERRED EMBODIMENTS

Figure 1:
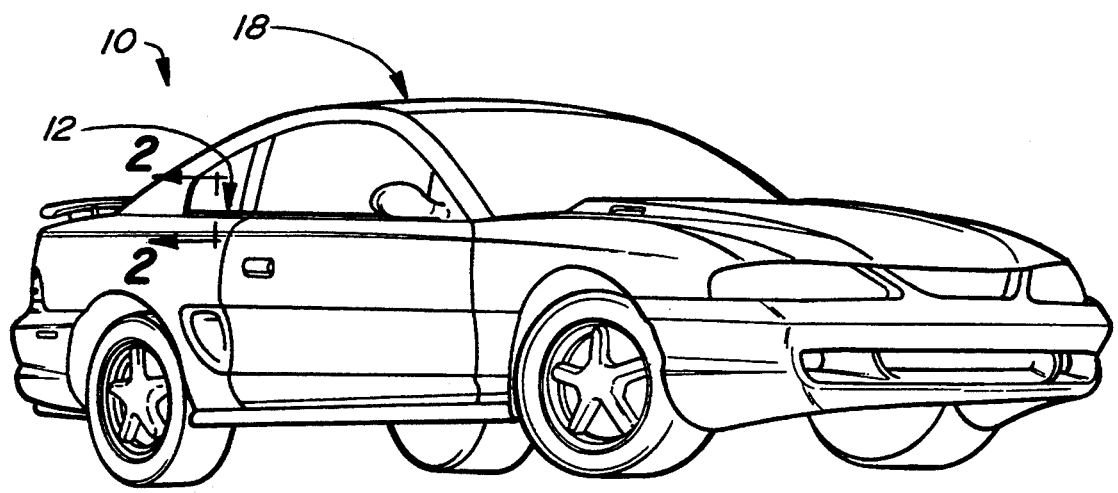
FIG. 1 is a perspective view of a vehicle wherein a retention clip member in accordance with the present invention may be utilized.
Figure 2:
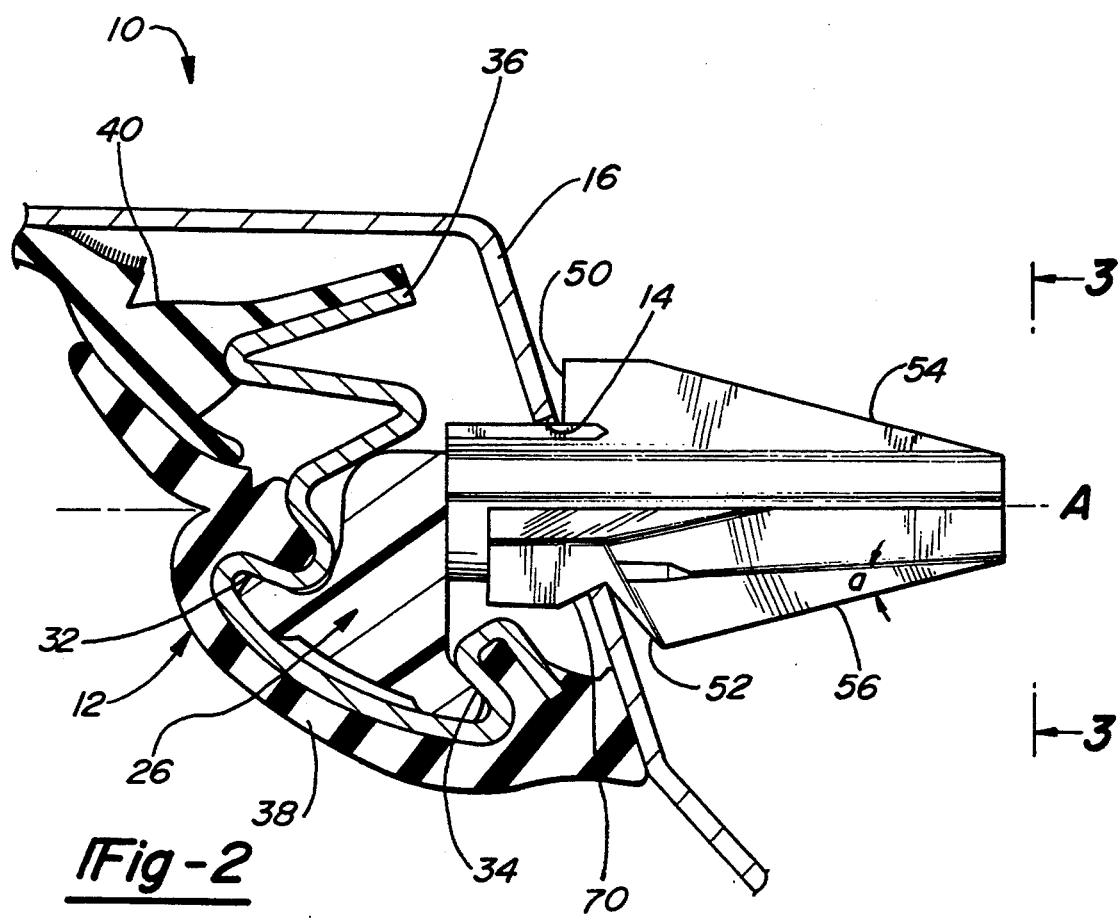
FIG. 2 is a section taken along line 2—2 showing a belt shelf weatherstrip utilizing the retention clip member of the present invention.

Now referring to the figures, specifically FIGS. 1 and 2, there is disclosed a retention clip member generally shown at 10. The retention clip member 10 is provided for securement of a trim member or the like, generally indicated at 12, into a slot 14 in a sheet 16 of a vehicle generally indicated at 18.

Referring now to FIG. 4, the retention clip member 10 includes base portion 20 a shaft portion 22 and a locking protrusion portion 24. Base portion 20 includes a means for attachment of the clip member 10 to the trim member 12 generally indicated at 26. The means for attachment 26 is shown in the figures as a dovetail attachment with legs 28 and 30. The trim member 12 is shown as a belt shelf weatherstrip which includes a dovetail slide formed by elongated recess portions 32 and 34. This provides for sliding engagement in the respective elongated recess portions 32 and 34 in the trim strip member 12. The belt shelf type weatherstrip 12 includes a metal core member 36 and outer surfaces 38 and 40. Surfaces 38 and 40 are preferably extruded over the core, out of a rubber, plastic, elastomer or other materials. In a the preferred embodiment, a dovetail type connection is utilized. However, as it will readily be appreciated by those skilled in the art, any suitable means for attachment of the clip member 10 can be used. For instance, in a second preferred embodiment, the clip member 10 is integrally molded with an end cap member to provide a suitable attachment. However, even in this configuration, the end cap member may include a dovetail protrusion which would fit in the grooves defined by portions 32 and 34 in order to engage the trim strip 12 when fitting an end cap onto the trim strip.

Base member 20 of the clip also includes a detent portion 42 which has a base 44 to which the shaft 22 is attached. The shaft portion 22 is shown as having a cylindrical cross-section best shown in FIG. 5. Shaft 22 also includes locating protrusions 46 and 48. Shaft 22 could also be provided in other configurations, depending on the flexibility or stiffness desired. Thus, other cross-sectional configurations of the shaft portion 22, such as egg shaped, oval or hexagonal, among others, could be utilized in the present invention. Shaft portion 22 includes an axis A—A, as shown in FIG. 4. The shaft portion 22 is made out of material which allows it to be resiliently deflectable and/or twistable about axis A—A. In a preferred embodiment, the entire clip portion 10 is injection molded from a nylon material. In a particularly preferred embodiment, an exterior grade Zytel ST801 Dupont material is utilized which is ultraviolet stabilized. Shaft portion 22 generally may be said to run through the entire locking protrusion 24. However, the flexible portion of the shaft runs from the base 44 up until the locking shelves 50 and 52 of protrusion 24, best shown in FIG. 2.

Locking protrusion 24 includes at least a single ramp surface offset from the axis A—A of shaft portion 22, which provides for the rotational deflection of the protrusion when contacting a side of the slot 14. In a preferred embodiment, locking protrusion 24 includes a first ramp surface 54 and a second ramp surface 56. The ramp surfaces, while they may be of many configurations, are preferably formed from a solid pyramidal oblique triangular protrusion which is thicker at the base portion for forming the locking shelves 50 and 52, and is thinner at the distal end. Thus, the ramp surfaces 54 and 56 are formed by an edge of the pyramidal shaped protrusions.

The locking protrusion also includes locating tang portions 58 and 60 which are spaced from the shaft portion, yet extend into the detent 42.

Referring now to FIG. 5, the tang portions 58 and 60 include a locating surface 62 and 64 which engages the side of the slot 14 when the clip member 10 is in full engagement with the slot 14 for locking of the clip and trim member to the sheet metal member 16. Also provided are outermost edges 66 and 68 which provide a locating feature if a narrow slot, shown in dotted lines as 14A, is utilized in the sheet metal 16. The ramp surfaces 54 and 56 are angled and, as stated above, are offset from the axis A—A such that relative movement of the clip member 12 in an axial direction into the slot 14 engages these surfaces and provides rotational deflection of the protrusion, thereby rotationally twisting the shaft portion 22. The angular orientation of the ramp surfaces 54 and 56 is best shown in FIG. 2 as angle a. This angle generally may be from about 3° to about 20°, and typically is from about 5° to about 15°. Preferably, the angle is in a range from about 7° to about 10° to provide optimum deflection with minimum pressure on the trim strip or clip member. The ramp surface, whether it be 54 or 56, is configured such that a plane passing through the ramp member is non-coplanar with a plane drawn through the axis of said shaft portion. This provides for the proper offset for twisting of the protrusion in the shaft portion 22. Thus, typically, a plane drawn through the ramp edge 54,56 would intersect a plane drawn through the axis A.

As will be readily appreciated by those skilled in the art, the ramp edge can be configured in other ways than as shown. Thus, the ramp edge could be arcuate or slanted in other orientations provided the proper deflection of the protrusion is accomplished.

The surface 52 is shown to be slanted in the drawings for engagement of a slanted sheet metal surface in a vehicle, such as shown at 16 in FIG. 2, for a belt shelf application or the like. It is to be readily appreciated that the locking shelves 50 and 52 may be provided in the same plane wherein a locking shelf, such as shelf 50, would be symmetrically provided on the other side of the protrusions for locking of the clip on a flat non-angled sheet metal surface of a vehicle. Similarly, the slanted surface 70 is provided for engagement of the slanted sheet metal, such that it rests directly on the upper portion of the sheet metal, to ensure retention of the clip in the sheet metal 16.

In operation, a sheet portion 16 such as a body panel sheet or the like, which includes an elongated slot 14 (or 14a), is provided. A trim strip or other member such as a glass run channel, fascia ornament or the like, which is attached to a clip member 10 is provided. The clip member is inserted into the slot in a direction along axis A, with the distal end being inserted into the slot. During insertion into the slot, the ramp portions 54 and 56 engage the sides of the slot 14(b). As the surfaces 54 and 56 move relative to surfaces 14(b) of the slot, the interference between these surfaces twists the shaft portion 22. This moves the shelves 50 and 52 out of engagement with the sides of the slot, and into a position for passing through the slot as shown in the dashed lines of FIG. 3. Upon reaching the locking shelf portions 50 and 52, the resilience of shaft 22 twists the protrusion in the direction of the arrows, as shown in FIG. 3, such that the protrusion and locking shelves 50 and 52 twist back to their normal position, as shown in solid lines in FIG. 3. This operably locks the trim member and the clip to the sheet metal portion 16 by interference of shelves 50 and 52 with the sheet metal 16. This is also shown in FIG. 5 wherein it is also shown that the bearing surfaces 46, 64, 48, 62 and, in some cases 66 and 68, provide a four or six point positioning in the slot, depending on the type of slot used in the sheet metal 16.

Figure 6:
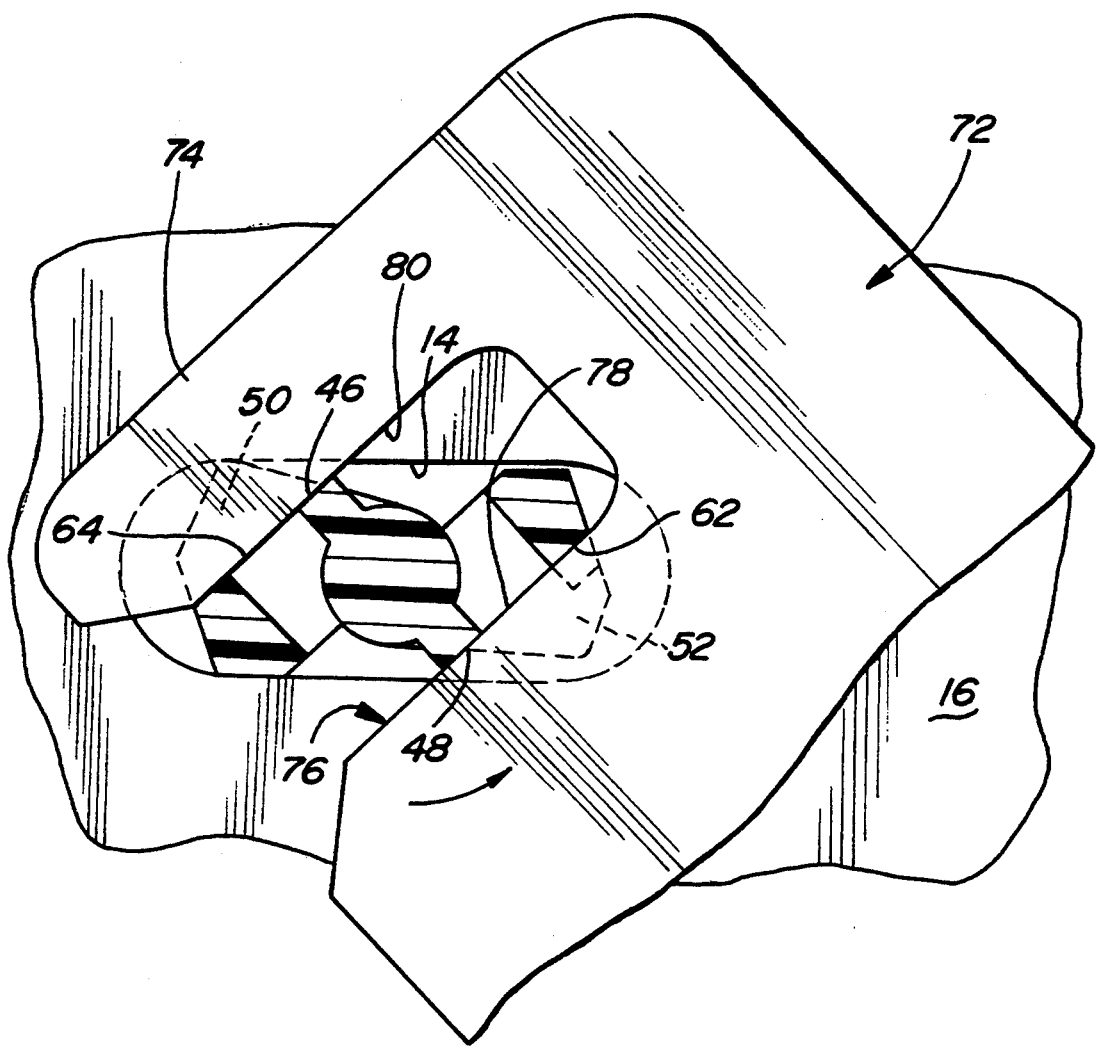
FIG. 6 is a view similar to FIG. 5 showing rotation of the locking protrusion of the clip member for releasing it from engagement with the sheet metal of a vehicle.

Referring now to FIG. 5, the present invention also has the advantage that it is readily configured for easy removal from the sheet metal 16, should it be desired to change the trim member. Thus, referring to FIG. 5, an elongated tool is generally shown at 72. Elongated tool 72 includes a tool head 74 which includes a slotted portion generally indicated at 76, slotted portion 76 includes sides 78 and 80 for forming a slot, all of which is best shown in FIG. 6. The sides 78 and 80 engage the surfaces 64 and 62 of the tang portions by inserting the tool underneath the trim member and aligning it with these tang portions. The tool can be placed in alignment with the tabs. The surfaces 46 and 48 are also shown to be engaged which assists in transmitting of the rotational forces to the protrusion. However, engagement of these protrusions is not essential to operation of the removal tool of the present invention. By rotation of the tool, as indicated by the arrow in FIG. 6, the locking protrusion 24 is rotated and locking shelves 50 and 52 are disengaged from their interference fit with the sheet metal 16. Thereafter, the protrusion may be withdrawn from the slot along axis A, and the trim member easily removed from the sheet metal 16.

The above description constitutes a preferred embodiment of the present invention, which is set forth in terms of illustration, rather than limitation. It is to be appreciated that the invention is susceptible to modification, variation and change without departing from the proper scope and fair meaning of the accompanying claims.

What is claimed is:

1. A retention clip member for securement of a trim member to a sheet portion of a vehicle comprising:
   a base portion having a means for providing attachment of said clip member to said trim member;
   a shaft portion, having an axis connected to said base member, said shaft portion adapted for resilient rotational deflection thereby allowing for rotation deflection about said axis;
   a locking protrusion extending from said shaft portion; said locking protrusion including a first ramp surface and a second ramp surface terminating at a pair of respective locking shelves;
   said ramp surfaces being offset from said axis of said protrusion and configured to deflect against opposite sides of a slot in the sheet metal of a vehicle to provide rotational defection of said protrusions, during insertion of said protrusion into the in the sheet metal of a vehicle, said shaft resiliently rotating upon reaching said pair of respective locking shelfs such that said clip is secured in said slot.

2. The clip member of claim 1 wherein said ramp member is offset from said axis for providing the resilient rotational deflection of said locking protrusion.

3. The clip member of claim 1 wherein said ramp member includes a ramp edge and a plane passing through said ramp member is non-coplanar with a plane drawn through the axis of said shaft portion.

4. The clip member of claim 1 wherein said plane passing through said ramp edge is intersects said plane passing through said axis.

5. The clip member of claim 1 further comprising at least one locating tang having surfaces for engaging a side portion of a slot.

6. The clip member of claim 1 wherein said base portion includes a detent, said shaft portion being connected to said base in said detent.

7. A retention clip member for securement of a trim member to a sheet portion of a vehicle, said clip member comprising:
   a base portion, said base portion including a means for attachment of said clip member to a trim member, said base member including a detent portion therein;
   a shaft portion attached to said base portion in said detent, said shaft portion having an axis therethrough, said shaft portion being resiliently deflectable in a direction substantially about said axis, said shaft portion having a cross-sectional shape which allows such deflection;
   a locking protrusion extending from said shaft portion, said locking protrusion including a pair of locking shelves which are offset from one another for engaging opposite sides of a slot in said sheet portion in a vehicle, a pair of ramp members leading to respective shelf portions, said ramp members for causing said locking protrusion to rotate in a first direction during insertion of said protrusion into said slot by interference between said pair of sides in the slot and said ramp portions, said protrusion rotating in a second direction upon complete entry into said slot such that said pair of locking shelves engage said sheet portion for retention of said clip member to said sheet metal.

8. The retention clip of claim 7 further comprising a means for allowing rotation of said member in said first direction to allow removal of said clip.

9. The retention clip of claim 8 further comprising a pair of tangs extending from said protrusion for allowing engagement and turning of said protrusion by a tool.

10. The retention clip of claim 9 wherein tangs extend into said detent portion.

11. A retention clip member for securement of a trim member to a sheet portion of a vehicle comprising:
    a base portion having a menus for providing attachment of said clip member to said trim member;
    a shaft potion connecting said base potion and a locking protrusion said shaft portion, having an axis, said shall portion being rotationally resilient thereby allowing for relative rotational deflection of said locking protrusion with respect to said base member about said axis;
    a locking protrusion extending axially from said shaft potion; said locking protrusion including a locking shelf for engaging said sheet of said vehicle and a ramp portion; said ramp portion operable for rotating said locking protrusion in a first direction during insertion of said protrusion into a slot in the sheet metal of a vehicle, said shaft resiliently rotating in a direction opposite said first direction upon reaching said locking shelf such that said clip is secured in said slot.

12. A retention clip member for securement of a trim member to a sheet portion of a vehicle comprising:
    a base potion having a means for providing attachment of said clip member to said trim member;
    a shaft portion, having an axis connected to said base member, said shaft potion adapted for resilient rotational deflection thereby allowing for rotational deflection about said axis;
    a locking protrusion extending from said shaft portion; said locking protrusion including a locking shelf for engaging said sheet of said vehicle and a ramp portion; at least one ramp surface terminating at a locking shelf, said ramp surface being offset from said axis and configured to deflect against a side of on aperture in said sheet of vehicle for rotating said locking protrusion during insertion of said protrusion into a slot in the sheet metal of a vehicle, said shaft resiliently rotating upon reaching said locking shelf such that said clip is secured in said slot.

13. A retention clip member for securement of a trim member to a sheet portion of a vehicle comprising:
    a base portion having a means for providing attachment of said clip member to said trim member, said base portion including at least one detent;
    a shaft portion, having an axis, connected to said base member in said detent, said shaft potion adapted for resilient rotational deflection thereby allowing for rotational deflection about said axis;
    a locking protrusion extending from said shaft portion; said locking protrusion including a locking shelf for engaging said sheet of said vehicle and a ramp portion; said ramp portion operable for rotating said locking protrusion during insertion of said protrusion into a slot in the sheet metal of a vehicle, said shaft resiliently rotating upon reaching said locking shelf such that said clip is secured in said slot; and a least one locating tang spaced from said shaft portion and extending, into said detent for engaging a side potion of the slot thereby locating said clip member in the slot.

* * * * *

UNITED STATES PATENT AND TRADEMARK OFFICE
CERTIFICATE OF CORRECTION

PATENT NO. : 5,448,804
DATED : September 12, 1995
INVENTOR(S) : Lawrence L. Warren It is certified that error appears in the above-indentified patent and that said Letters Patent is hereby corrected as shown below:

Column 2, line 57, delete "the"

Column 5, line 21, claim 1, delete "in the"

Column 5, line 24, claim 1, "shelfs" should be --shelves--

Column 5, line 34, claim 1, delete "is"

Column 6, line 11, claim 11, "menus" should be --means--

Column 6, line 15, claim 11, "shall" should be --shaft--

Column 6, line 20, claim 11, "potion" should be --portion--

Column 6, line 30, claim 12, "potion" should be --portion--

Column 6, line 33, claim 12, "potion" should be --portion--

Column 6, line 42, claim 12, "on" should be --an--

Column 6, line 54, claim 13, "potion" should be --portion--

UNITED STATES PATENT AND TRADEMARK OFFICE
CERTIFICATE OF CORRECTION

PATENT NO. : 5,448,804

DATED : September 12, 1995

INVENTOR(S) : Lawrence L. Warren

It is certified that error appears in the above-indentified patent and that said Letters Patent is hereby corrected as shown below:

Column 6, line 66, claim 13, "potion" should be ---portion---

Signed and Sealed this

Nineteenth Day of December, 1995

Attest:

Attesting Officer

BRUCE LEHMAN

Commissioner of Patents and Trademarks